US012595802B2

(12) United States Patent
Murukesan et al.

(10) Patent No.: US 12,595,802 B2
(45) Date of Patent: Apr. 7, 2026

(54) WHEELS INCLUDING A COATING LAYER AND METHODS FOR MAKING THE SAME

(71) Applicant: Garrett Transportation I Inc., Torrance, CA (US)

(72) Inventors: Palaniappa Murukesan, Bangalore (IN); Philippe Renaud, Thaon-les-Vosges (FR); Yann Simler, Thaon-les-Vosges (FR); Mathieu Staub, Thaon-les-Vosges (FR); Francois Kuehn, Golbey (FR)

(73) Assignee: Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 18/649,081

(22) Filed: Apr. 29, 2024

(65) Prior Publication Data

US 2025/0277493 A1 Sep. 4, 2025

(30) Foreign Application Priority Data

Feb. 29, 2024 (IN) ............................ 202411014911

(51) Int. Cl.
*F04D 29/28* (2006.01)
*F04D 29/02* (2006.01)

(52) U.S. Cl.
CPC ......... *F04D 29/023* (2013.01); *F04D 29/284* (2013.01); *F05D 2220/40* (2013.01); *F05D 2300/121* (2013.01); *F05D 2300/173* (2013.01); *F05D 2300/175* (2013.01); *F05D 2300/506* (2013.01); *F05D 2300/611* (2013.01)

(58) Field of Classification Search
CPC ...... F04D 29/023; F04D 29/284; F01D 5/288; F01D 5/28; F05D 2300/611
See application file for complete search history.

(56) References Cited

U.S. PATENT DOCUMENTS

| | | | | |
|---|---|---|---|---|
| 10,941,501 | B2 | 3/2021 | Eidschun et al. | |
| 2011/0206532 | A1 | 8/2011 | Sorbo et al. | |
| 2017/0370003 | A1* | 12/2017 | Schall | C23C 18/1637 |
| 2018/0171483 | A1* | 6/2018 | Nambu | F04D 29/023 |

FOREIGN PATENT DOCUMENTS

| | | | |
|---|---|---|---|
| EP | 1979511 | B1 | 10/2008 |
| EP | 2383369 | A1 | 11/2011 |
| EP | 2752502 | A | 7/2014 |
| EP | 2752502 | B1 | 7/2014 |
| EP | 3273065 | A1 | 1/2018 |
| EP | 4067668 | A1 | 10/2022 |
| JP | 2012087325 | A | 5/2012 |
| WO | 2022181165 | A1 | 9/2022 |

OTHER PUBLICATIONS

International Search Report and Written Opinion for PCT/US2025/011017, dated Apr. 28, 2025, in English.

* cited by examiner

*Primary Examiner* — Michael L Sehn
(74) *Attorney, Agent, or Firm* — BelayIP

(57) ABSTRACT

A wheel includes a hub portion configured to rotate about a rotational axis. A plurality of blades extends radially outward from the hub portion. Each blade of the plurality of blades includes a leading edge and a trailing edge. The hub portion and the plurality of blades include a substrate metal. The substrate metal of the plurality of blades has coated directly thereon a coating layer that has a hardness of about 800 HV or greater and that includes electroless nickel-phosphorous having a phosphorous content of from about 2 to about 4 wt. %.

9 Claims, 2 Drawing Sheets

WHEELS INCLUDING A COATING LAYER AND METHODS FOR MAKING THE SAME

CROSS-REFERENCE TO RELATED APPLICATIONS

This application is related to and claims all available benefit of Indian Provisional Patent Application IPA: 202411014911 filed Feb. 29, 2024, the entire contents of which are herein incorporated by reference.

TECHNICAL FIELD

The present disclosure generally relates to wheels for turbo-devices, for example, turbochargers, turbines or turbomachines, and/or the like. More particularly, the present disclosure relates to wheels having a coating layer formed thereon and methods for making the same.

BACKGROUND

Turbo-devices can be used in a variety of applications. For example, turbochargers for gasoline and diesel internal combustion engines are devices known in the art that are used for pressurizing or boosting the intake air stream, routed to a combustion chamber of the engine, by using the heat and volumetric flow of exhaust gas exiting the engine. Another example includes turbines or turbomachines for fuel cells. The turbine may be operatively connected to a fuel cell system and may be configured as an e-charger, electric turbocharger, or other turbo-device for the fuel cell.

In the case of turbochargers for internal combustion engines, the exhaust gas exiting the engine is routed into a turbine housing of a turbocharger in a manner that causes an exhaust gas-driven turbine wheel to spin within the housing. The exhaust gas-driven turbine wheel is mounted onto one end of a shaft that is common to a radial air compressor mounted onto an opposite end of the shaft and housed in a compressor housing. Thus, rotary action of the turbine wheel also causes the air compressor to spin within a compressor housing of the turbocharger that is separate from the turbine housing. The spinning action of the air compressor causes intake air to enter the compressor housing and be pressurized or boosted to a desired amount before it is mixed with fuel and combusted within the engine combustion chamber.

In recent years, there has been increasing pressure in the form of governmental legislation to reduce internal combustion engine emissions, such as $NO_x$ and particulate matter (PM). Oxides of nitrogen ($NO_x$) may be formed when temperatures in the combustion chamber are about 2500° F. or hotter. At these elevated temperatures, the nitrogen and oxygen in the combustion chamber may chemically combine to form nitrous oxides.

Exhaust gas recirculation (EGR) is a method that has been used to reduce the level of $NO_x$ in exhaust gases. In EGR systems, some of the exhaust gases that would otherwise be discharged into the environment are recirculated into the intake stream. The recirculated exhaust gases have already combusted and have a significantly lower oxygen content, so they do not burn again when they are recirculated. The exhaust gases may displace some of the normal intake charge. As a result, the combustion process may be cooler by several hundred degrees so that $NO_x$ formation may be reduced.

The use of EGR, however, results in an increased amount of water that is condensed out of the recirculated exhaust gases. The amount of water that is condensed may depend, for example, on temperature, humidity, and operating speed of the engine. When present, the condensed water droplets in the intake stream are passed through an inlet and impact the spinning compressor wheel, and as a result, an erosive effect may be observed over time. This can cause the components to prematurely fail.

Similarly in turbines for fuel cells, when present, condensed water droplets in the intake stream are passed through an inlet and impact the spinning fuel cell turbine wheel, and as a result, an erosive effect may also be observed over time. As a result, such components as well may prematurely fail.

Accordingly, it is desirable to provide wheels for turbo-devices that are able to withstand the erosive effects of water droplets, without requiring the use of heavier and relatively expensive materials. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Wheels having a coating layer formed thereon and methods for making the same, are disclosed herein.

In an exemplary embodiment, a wheel includes a hub portion configured to rotate about a rotational axis. A plurality of blades extends radially outward from the hub portion. Each blade of the plurality of blades includes a leading edge and a trailing edge. The hub portion and the plurality of blades include a substrate metal. The substrate metal of the plurality of blades has coated directly thereon a coating layer that has a hardness of about 800 HV or greater and that includes electroless nickel-phosphorous having a phosphorous content of from about 2 to about 4 wt. %.

In another exemplary embodiment, a wheel includes a hub portion configured to rotate about a rotational axis. A plurality of blades extends radially outward from the hub portion. Each blade of the plurality of blades includes a leading edge and a trailing edge. The hub portion and the plurality of blades include a substrate metal. The substrate metal includes aluminum or an alloy thereof. The substrate metal of the plurality of blades has coated directly thereon a coating layer that has a hardness of from about 800 to about 950 HV and that includes electroless nickel-phosphorous having a phosphorous content of from about 2 to about 4 wt. %.

In another exemplary embodiment, a method for making a wheel includes providing a substrate wheel. The substrate wheel includes a hub portion configured to rotate about a rotational axis. A plurality of blades extends radially outward from the hub portion. Each blade of the plurality of blades includes a leading edge and a trailing edge. The hub portion and the plurality of blades include a substrate metal. The method further includes forming on the substrate metal a coating layer that includes electroless nickel-phosphorous having a phosphorous content of from about 2 to about 4 wt. %. Forming the coating layer includes immersing the substrate wheel in an electroless nickel-phosphorous plating bath that includes nickel cations and phosphorous oxide anions. The method further includes exposing the substrate wheel including the coating layer to a heat treatment process at heat treating conditions effective to increase a hardness of the coating layer to about 800 HV or greater.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The inventive subject matter will hereinafter be described in conjunction with the following drawing figures, wherein like numerals denote like elements, and wherein.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Unless specifically stated or obvious from context, as used herein, the term "about" is understood as within a range of normal tolerance in the art, for example within 2 standard deviations of the mean. "About" can be understood as within 10%, 5%, 1%, 0.5%, 0.1%, 0.05%, or 0.01% of the stated value. "About" can alternatively be understood as implying the exact value stated. Unless otherwise clear from the context, all numerical values provided herein are modified by the term "about."

The present disclosure is generally directed to wheels for turbo-devices in which the wheels have a coating layer disposed thereon and methods for making the same. In particular, the present disclosure addresses the aforementioned erosion problem with the use of a relatively low range phosphorous content (e.g., about 2 to about 4 wt. %), electroless nickel-phosphorus as a protective coating layer overlying the wheel's substrate metal formed, for example, of a relatively soft aluminum or aluminum alloy substrate. The coating layer has been heat treated so as to have a relatively high hardness (about 800 HV or greater). This coating layer disposed directly on the soft aluminum substrate provides additional hardness (e.g., about 800 HV or greater) and helps the wheel including particularly the blades to withstand the erosive effects of water droplets, without requiring the use of heavier and relatively expensive materials.

Figure 1:
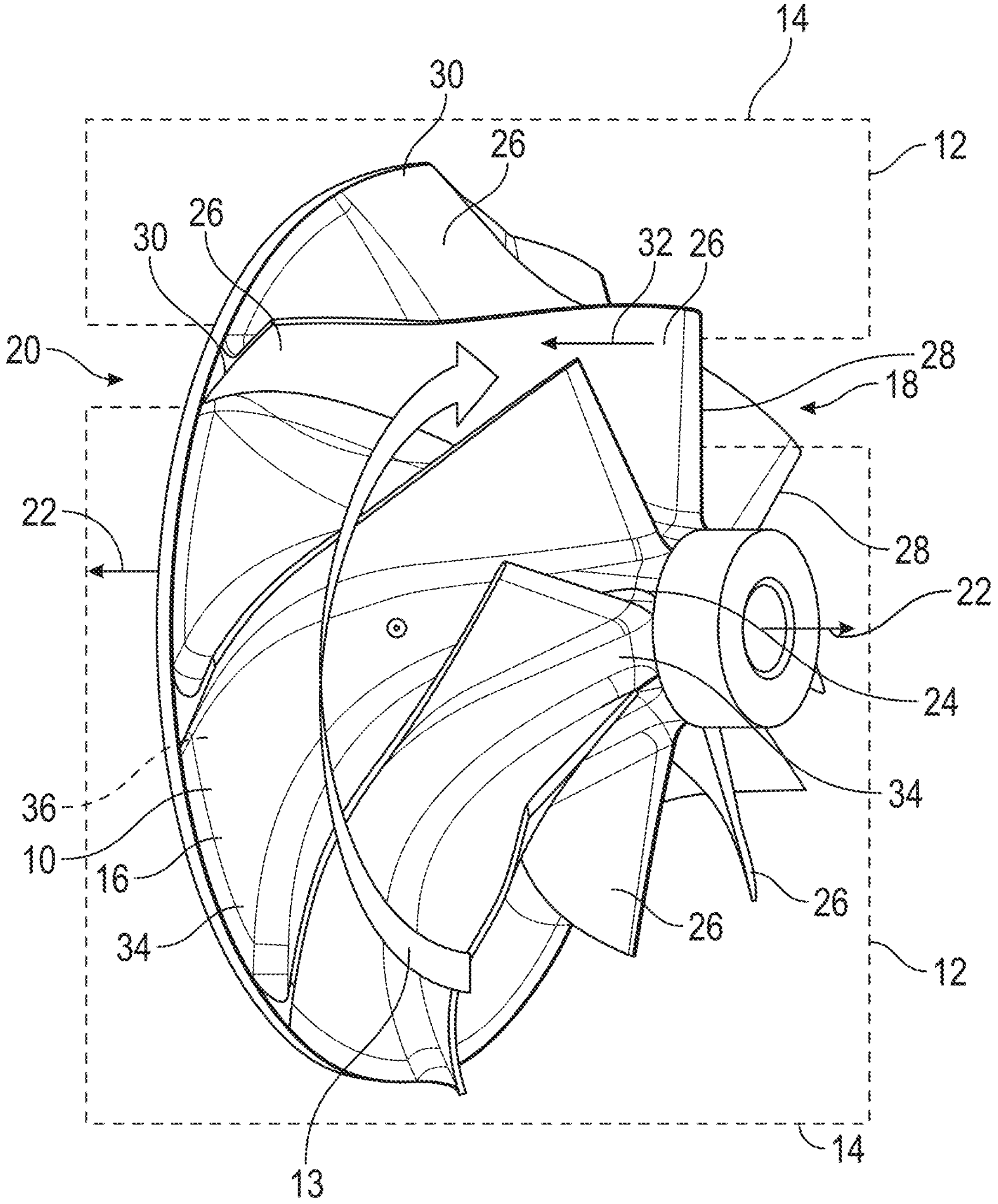
FIG. 1 is a perspective view of a wheel operatively disposed in a turbo-device, which is schematically illustrated, in accordance with some embodiments of the present disclosure.

Referring to FIG. 1, a perspective view of a wheel 10 operatively disposed in a turbo-device 12 is provided. In the illustrated embodiment, the turbo-device 12 is configured as a turbocharger 14 for an internal combustion engine and the wheel 10 is configured as a turbocharger compressor wheel 16. A non-limiting example of turbochargers for internal combustion engines including turbocharger compressor wheels is described in U.S. Pat. No. 11,566,631, filed on Mar. 29, 2021, which is owned by the assignee of the present application and is hereby incorporated by reference in its entirety for all purposes.

As illustrated, the wheel 10 is operatively disposed in the turbo-device 12 between an inlet 18 and an outlet 20 to rotate (indicated by single headed arrow 13) about a rotational axis 22. The wheel 10 is a radial wheel that includes a hub portion 24 and a plurality of blades 26 that extend radially outward from the hub portion 24. The blades 26 have a backward curvature rather than being configured to extend in a purely radial blade configuration. Each blade 26 includes a leading edge 28 that is in fluid communication with the inlet 18 and a trailing edge 30 that is in fluid communication with the outlet 20. The leading edges 28 define the beginning of an intake area for the combined set of blades 26, extending through the circular paths of roughly the upstream ⅓ of the blades 26. The trailing edges 30 define the end of an annular output area for the combined set of blades 26, extending through the circular paths of roughly the downstream ⅓ of the blades 26.

During operation of the turbo-device 12, the wheel 10 rotates about the rotational axis 22 and the leading edges 28 receive intake air that passes through the inlet 18 and advances rearwardly (indicated by single headed arrow 32) along the blades 26 towards the trailing edges 30. As such, the leading edges 28 are positioned longitudinally forward of the trailing edges 30 of the blades 26 with respect to the rotational axis 22 and the flow of air 32 along the wheel 10. As noted above, the wheel 10 is a turbocharger compressor wheel 16 in which the blades 26 are configured to compress the intake air to form compressed or pressurized air. The pressurized air passes from the trailing edges 30 and is ejected out through the outlet 20.

In some embodiments, the hub portion 24 and the blades 26 are formed of a substrate metal 36, such as, aluminum or an aluminum alloy, for example, via a casting and/or machining process. The wheel 10 is provided with a coating layer 34 on and overlying the substrate metal 36 and includes or is formed of electroless nickel-phosphorous. The phosphorous content of the coating layer 34 may be greater than or equal to about 2 wt. %, for example from about 2 to about 4 wt. %, such as from about 2 to about 3 wt. %, for example from about 2 to about 2.6 wt. %. In an exemplary embodiment, the nickel content of the first coating layer 34 is less than or equal to about 98 wt. %, such, from about 96 to about 98 wt. %, such as from about 97 to about 98 wt. %, for example, from about 97.4 to about 98 wt. %.

In an exemplary embodiment, the coating layer 34 has a thickness from about 20 to about 30 microns, for example from about 22 to about 28 microns. The coating layer 34 may be provided on all or most of the surfaces of the wheel 10, both forward and rear facing. If the coating layer 34 is not provided on all of the surfaces, the surfaces not coated with the coating layer 34 may include functional surfaces, such as portions of the back facing hub portion 24 about the centerline (axis of rotation 22) or portions of the forward-facing hub portion 24.

In an embodiment, the coating layer 34 has a hardness of about 800 HV or greater. Some embodiments, the coating layer 34 has a hardness of about 800 HV to about 950 HV. As will be discussed in further detail below, in some embodiments, the wheel 10 has been subjected to a heat treating process after deposition of the electroless nickel-phosphorous that forms the coating layer 34 to improve the hardness of the coating layer 34 to enhance erosion resistance.

Figure 2:
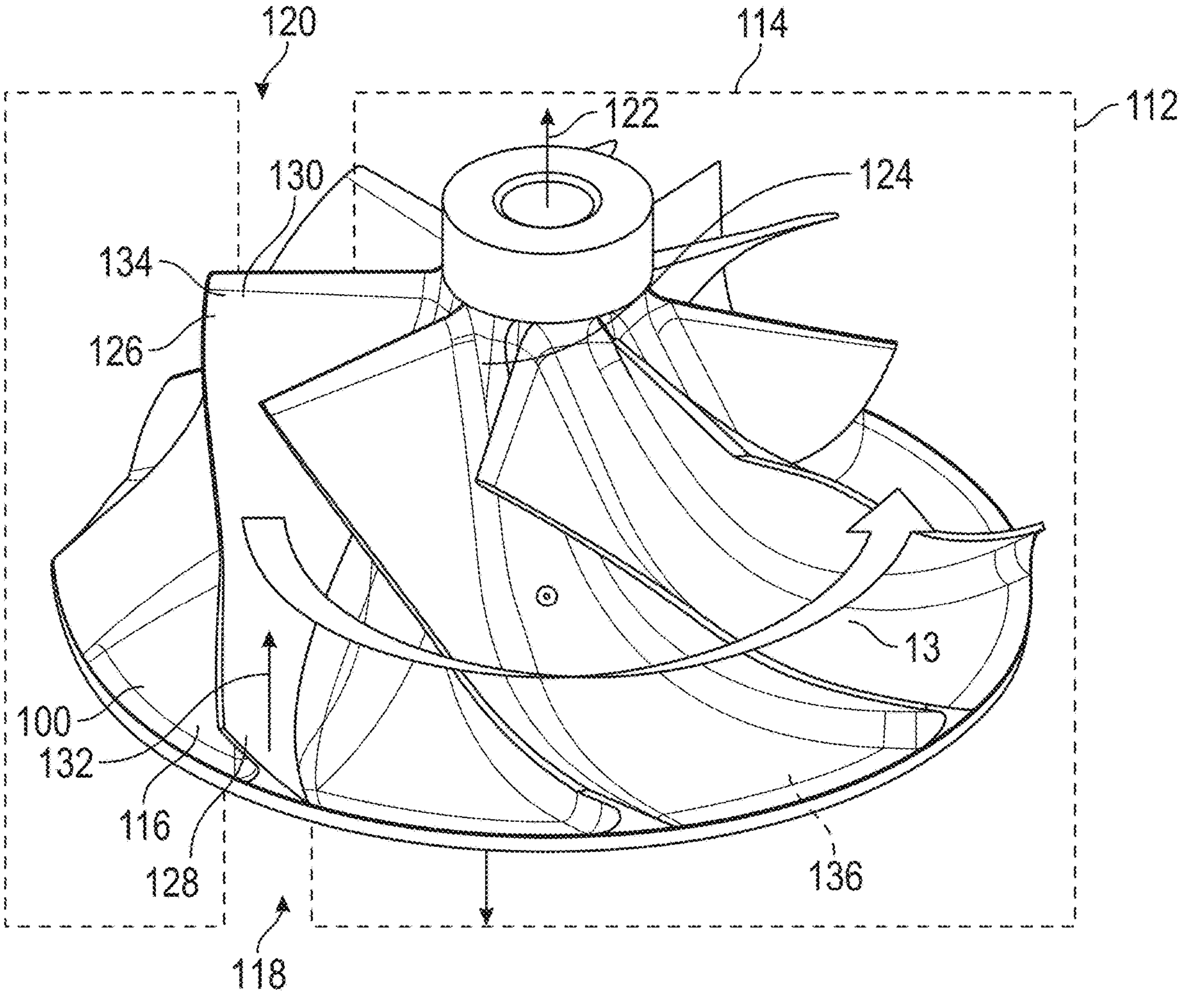
FIG. 2 is a perspective view of a wheel operatively disposed in a turbo-device, which is schematically illustrated, in accordance with some embodiments of the present disclosure.

Referring to FIG. 2, a wheel 100 that is operatively disposed in a turbo-device 112 between an inlet 118 and an outlet 120 is provided. In the illustrated embodiment, the turbo-device is a turbine 114 for fuel cells and the wheel 100 is configured as a fuel cell turbine wheel 116. A non-limiting example of turbines for fuel cells including fuel cell turbine wheels is described in U.S. Patent Application Publication No. 2022/0006369, filed on Jul. 1, 2020, which is owned by the assignee of the present application and is hereby incorporated by reference in its entirety for all purposes.

In particular, the wheel 100 including the rotational axis 122, the hub portion 124, the blades 126, the leading edges 128, the trailing edges 130, the substrate metal 136, and the coating layer 134 are similarly configured to the wheel 10 as discussed above in relation to FIG. 1 including the rotational axis 22, the hub portion 24, the blades 26, the leading edges 28, the trailing edges 30, the substrate metal 136, and the coating layer 134, respectively, but with the exception that the blades 126 are configured to expand the intake air received from the inlet 118, along the airflow direction 132 towards the trailing edges 130 to form an expanded or depressurized air. The expanded or depressurized air passes from the trailing edges 130 and is ejected out through the outlet 120.

Figure 3:
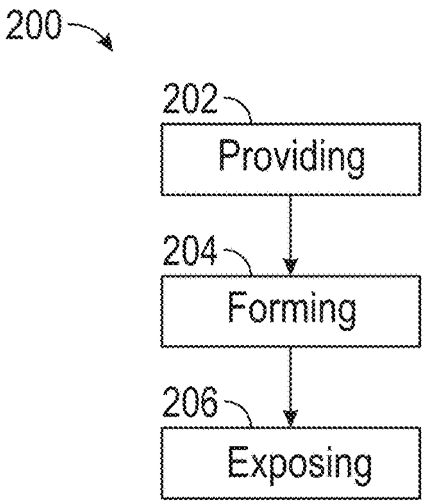
FIG. 3 is a flowchart illustrating a method for making a wheel in accordance with some embodiments of the present disclosure.

Referring to FIG. 3, the compressor wheel 10, 100 as discussed above may be made in accordance with a method 200 as illustrated in the flowchart. The method 200 includes a step 202 of providing a substrate wheel formed of a substrate metal, specifically a wheel made of aluminum (or alloy thereof) in the configuration discussed above in relation to FIGS. 1-2, with the exception of the coating layer. The substrate wheel may be manufactured using conventional manufacturing processes, such as casting and/or machining, or the like.

The method 200 continues with a step 204 of forming (e.g., via depositing) an electroless nickel-phosphorous coating layer onto the substrate metal of the substrate wheel. Electroless nickel-phosphorus plating is a chemical process that deposits an even layer of nickel-phosphorus alloy on the surface of the substrate metal. The process involves dipping the substrate wheel in a water solution containing a nickel salt and a phosphorus-containing reducing agent, for example a hypophosphite salt. The concentration of the phosphorous-containing reducing agent is selected so as to achieve a phosphorous amount in the coating layer greater than or equal to about 2 wt. %, for example about 2 to about 4 wt. %, as described above, and a nickel amount in the coating layer less than or equal to about 98 wt. %, for example, about 96 to about 98 wt. %, as described above. The reduction of the metal cations in solution to metallic form is achieved by purely chemical means, through an autocatalytic reaction. Before plating, the surface of the substrate may be cleaned. Cleaning may be achieved by a series of chemical baths, including non-polar solvents to remove oils and greases, as well as acids and alkalis to remove oxides, insoluble organics, and other surface contaminants. Further, functional portions of the substrate metal, as described above, may be optionally masked. Ingredients of the electroless nickel plating bath include a source of nickel cations $Ni^{2+}$, for example nickel sulfate and a suitable reducing agent, such as hypophosphite $H_2PO_3^-$. The plating bath may further include complexing agents, such as carboxylic acids or amines; stabilizers, such as lead salts or sulfur compounds; buffers; surfactants; and accelerators. In an exemplary embodiment, the plating bath has a pH of about 5 to about 8, for example about 5 to about 7. The plating process is controlled with temperature and time to achieve a desired uniform thickness of about 20 to about 30 microns, as described above. In an exemplary embodiment, the substrate wheel is immersed in the plating bath for a time of about 130 to about 170 minutes. Once Ni—P plating is complete, the substrate metal, now having the coating layer plated thereon, may be rinsed to remove any residues from the plating process, and the masking (if any) may be removed.

The method 200 continues with a step 206 by exposing the substrate wheel including the coating layer to a heat treating process at heat treating conditions effective to improve the hardness of the coating layer 34 to enhance erosion resistance. As described above, the heat treating process increases the hardness of the coating layer to about 800 HV or greater, for example, about 800 HV to about 950 HV. In an exemplary embodiment, step 206 includes exposing the substrate wheel including the coating layer to a temperature of about 200° C. to about 230° C. for a time of about 1 to about 4 hours. The method 200 may further include performing various finishing processes, such as final cleaning, polishing, and machining in addition to the heat treating process. The result is a wheel 10, 100 in accordance with that described above in connection with FIGS. 1-2.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A wheel comprising:

a hub portion configured to rotate about a rotational axis; and a plurality of blades extending radially outward from the hub portion, wherein each blade of the plurality of blades comprises a leading edge and a trailing edge, wherein the hub portion and the plurality of blades comprise a substrate metal, wherein the substrate metal of the plurality of blades has coated directly thereon, without any intermediate chemical conversion or phosphate layer, a coating layer configured to enhance erosion resistance against condensed water droplets in exhaust gas recirculation or fuel cell environments, the coating comprising:

a hardness of about 800 HV or greater, electroless nickel-phosphorous having a phosphorous content of from about 2 to about 4 wt. %, and a thickness of from about 20 to about 30 microns.

2. The wheel of claim 1, wherein the coating layer comprises the electroless nickel-phosphorous having the phosphorous content of from about 2 to about 3 wt. %.

3. The wheel of claim 1, wherein the coating layer comprises the electroless nickel-phosphorous having the phosphorous content of from about 2 to about 2.6 wt. %.

4. The wheel of claim 1, wherein the coating layer comprises the electroless nickel-phosphorous having a nickel content of about 96 to about 98 wt. %.

5. The wheel of claim 1, wherein the hardness of the coating layer is from about 800 to about 950 HV.

6. The wheel of claim 1, wherein the coating layer extends overlaying the substrate metal of the hub portion.

7. The wheel of claim 1, wherein the substrate metal comprises aluminum or an alloy thereof.

8. The wheel of claim 1, wherein the wheel is configured as a turbocharger compressor wheel or a fuel cell turbine wheel.

9. A wheel comprising:

a hub portion configured to rotate about a rotational axis; and a plurality of blades extending radially outward from the hub portion, wherein each blade of the plurality of blades comprises a leading edge and a trailing edge, wherein the hub portion and the plurality of blades comprise a substrate metal that comprises aluminum or an alloy thereof, wherein the substrate metal of the plurality of blades has coated directly thereon, without any intermediate chemical conversion layer or phosphate layer, a coating layer configured to enhance erosion resistance, the erosion caused by condensed water droplets, the coating comprising:

a hardness of from about 800 to about 950 HV, electroless nickel-phosphorous having a phosphorous content of from about 2 to about 4 wt. %, and a thickness of from about 20 to about 30 microns.

* * * * *